United States Patent [19]

Glovier

[11] 4,209,103

[45] Jun. 24, 1980

[54] UTILITY BOX LOCATOR

[76] Inventor: Lloyd H. Glovier, 150 S. Atlanta St., Apt. 26E, Roswell, Ga. 30075

[21] Appl. No.: 922,564

[22] Filed: Jul. 7, 1978

[51] Int. Cl.² ............................ H02G 3/08; G01B 5/14
[52] U.S. Cl. .................................. 220/3.4; 33/174 G; 33/DIG. 10
[58] Field of Search .................................. 220/3.4, 3.5; 33/DIG. 10, 174 G, 180 R, 189; 29/407, 413, 423

[56] References Cited

U.S. PATENT DOCUMENTS

| | | | |
|---|---|---|---|
| 1,653,251 | 12/1927 | Boyton | 220/3.4 |
| 2,775,812 | 1/1957 | Mohr | 33/189 X |
| 2,788,151 | 4/1957 | Shore | 220/3.4 |
| 2,898,688 | 8/1959 | Cottar | 33/174 G |
| 2,990,172 | 6/1961 | Gianotta | 33/DIG. 10 |
| 3,260,400 | 7/1966 | Miles | 220/3.4 |
| 3,888,013 | 6/1975 | Benoit | 33/DIG. 10 |
| 3,924,331 | 12/1975 | Goosen | 33/DIG. 10 |
| 4,059,905 | 11/1977 | Wieting | 33/DIG. 10 |

*Primary Examiner*—Allan N. Shoap
*Attorney, Agent, or Firm*—Robert B. Kennedy

[57] ABSTRACT

A locator for a utility box mountable to a stud with a box rim of preselected perimeter size and shape about a box opening facing a sheet of wallboard. The locator includes a support snuggly mounted to the utility box from which a locator pin projects, and a template of perimeter size and shape approximating that of the box rim and formed with an aperture sized to receive the locator pin. A method of locating a utility box overlaid with wallboard includes the steps of providing a projection on the utility box, overlaying the utility box with wallboard, puncturing the wallboard with the projection, placing a template over the wallboard with the projection extending through a template opening, and marking the wallboard about the template.

5 Claims, 13 Drawing Figures

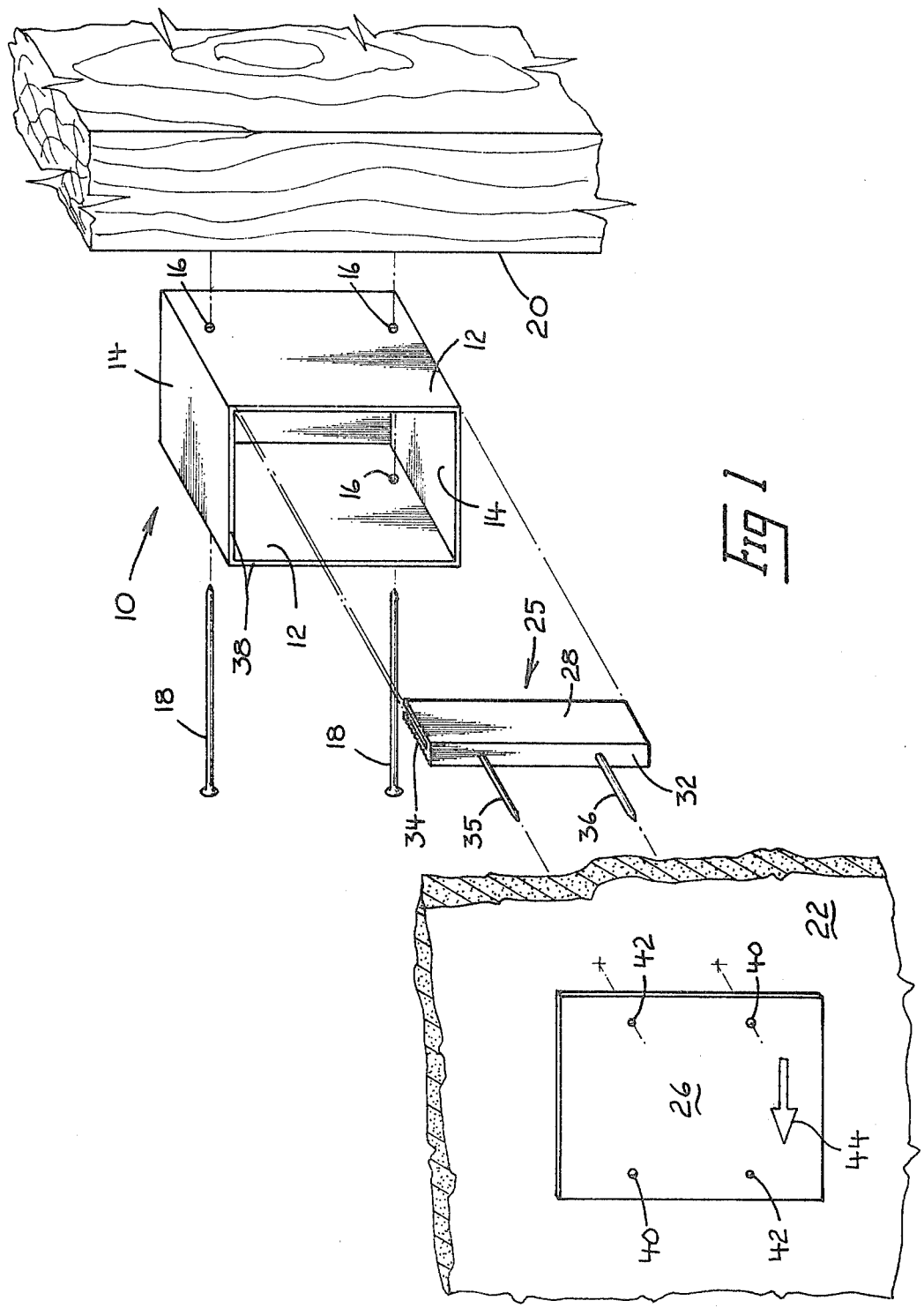

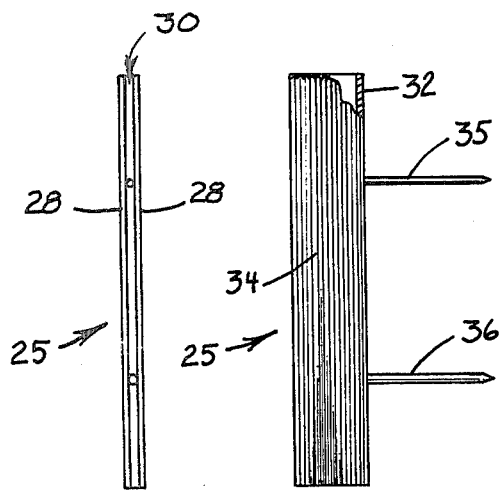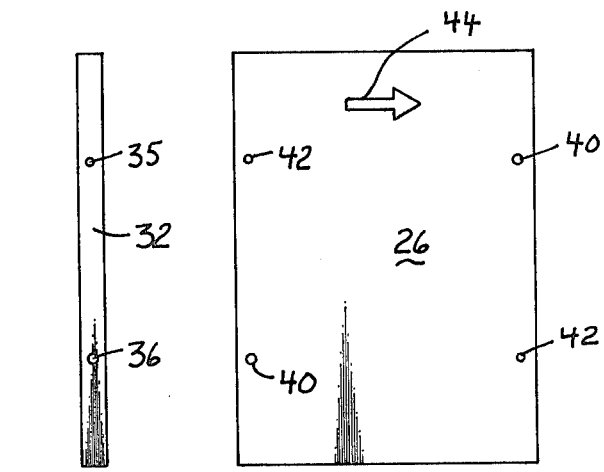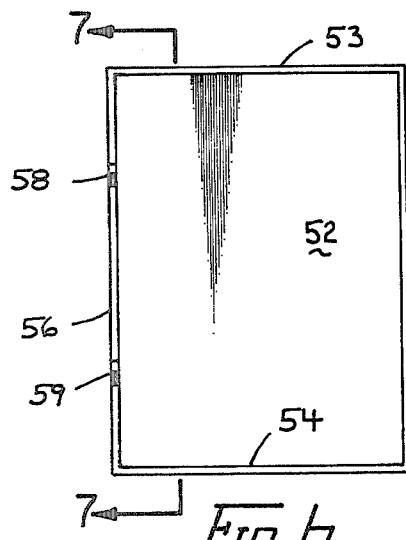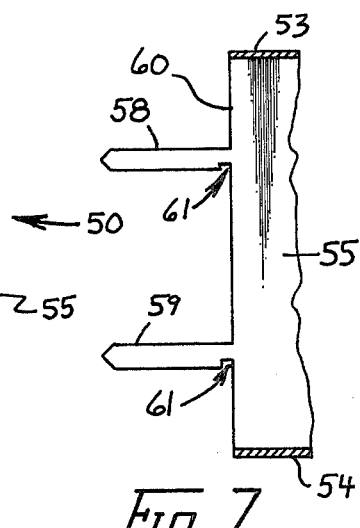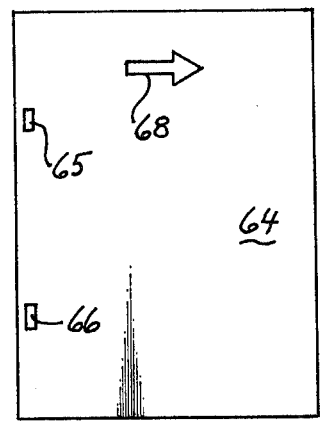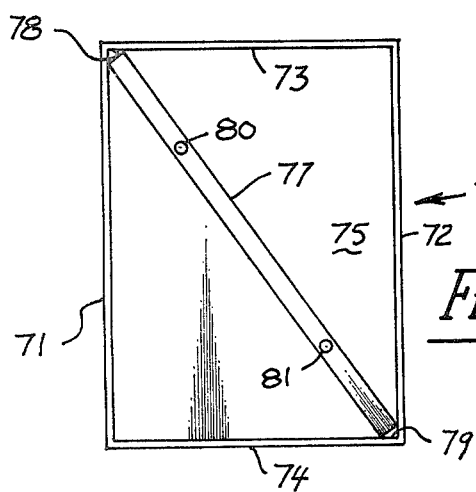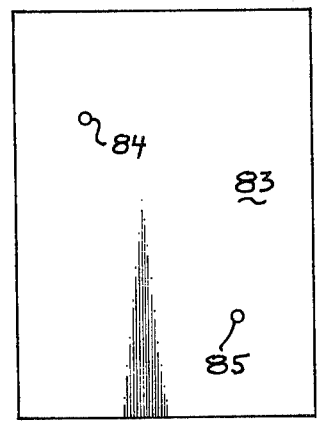

UTILITY BOX LOCATOR

BACKGROUND OF THE INVENTION

This invention relates generally to utility boxes, and particularly to means and methods for locating utility boxes mounted behind wallboard during the construction of buildings.

In the construction of buildings and building rooms a wooden frame is ordinarily erected which includes an array of upright studs that extend between floor and ceiling beams. After the building or room has been so framed the utilities for servicing the rooms, such as electrical wiring, water pipes and gas lines are mounted to the studs. The electrical wiring typically extends to a series of utility boxes that are mounted to the studs with a box opening facing the plane in which wallboard is to be subsequently erected. One or more electrical sockets may then be mounted within the utility box and electrically connected to the wiring. After the utility box, either with or without the sockets mounted therein, have been erected the studs are overlaid with sheets of wallboard. These typically take the form of four by eight foot sections of sheetrock which are placed upright over the studs and nailed in place. These sections of sheetrock are relatively large, heavy, cumbersome to handle and rather easily damaged.

Heretofore, it has been the usual practice of construction workers to mount the wallboard overlaying the utility boxes with only a few nails partially driven into the studs and then to draw a line upon the rear of the wallboard about the perimeter of the utility boxes. The workman then return to the other side of the wallboard and remove the nails and sheets from the studs. He then cuts an opening within the bounds of the perimeter marking, and then remounts the wallboard to the studs. If all has gone well the utility box will now be located within the opening cut from the wallboard thereby providing access to the electrical outlets housed or to be housed within the now exposed boxes.

The just described procedure of locating utility boxes behind wallboards is obviously very time consuming. Often it is impractical and difficult to practice such methods with only one construction worker available for the task. It frequently occurs that the initial removal of the sheetrock from the studs causes the sheetrock to chip or bend which action may easily impair the utility of the entire sheet due to the fragile composition of sheetrock. Furthermore, if a particular sheet has not been positioned flush to the next sheet during the initial mounting, the marking will be erroneous whereby a subsequent correct mounting will cause the marked location to be slightly offset from that of the true location of the utility box.

Accordingly, it is a general object of the present invention to provide improved means and methods for locating utility boxes.

More specifically, it is an object of the present invention to provide improved means and methods for locating a utility box mounted to a stud behind a sheet of wallboard.

Another object of the invention is to provide a locator for a utility box of the type described of relatively simple and economic construction.

Another object of the invention is to provide a locator for a utility box the use of which may be had with minimum training and with a high degree of reliability.

Still another object of the invention is to provide a method of locating a utility box mounted behind wallboard with improved accuracy and speed.

SUMMARY OF THE INVENTION

In one form of the invention a locator is provided for a utility box mountable to a stud with a box rim of preselected perimeter size and shape about a box opening facing a sheet of wallboard. The locator comprises a support adapted to be snuggly mounted to the utility box from which at least one locator pin projects, and a template of perimeter size and shape approximating that of the box rim and formed with at least one aperture sized to snuggly receive the locator pin.

In another form of the invention a locator is provided for a utility box mountable to a stud with a box rim of preselected perimeter size and shape about a box opening facing a sheet of wallboard. The locator comprises a locator pin projecting from the box rim, and a template of perimeter size and shape approximating that of the box rim and formed with an aperture sized to snuggly receive the locator pin.

In yet another preferred form of the invention a locator is provided for locating a utility box adapted to be mounted to a stud and overlaid with wallboard. The locator comprises puncture means secured to the utility box for puncturing the wallboard and thereby providing an index projection on the side of the wallboard distal the utility box. The locator further includes template means adapted to be placed upon the wallboard about the index projection for outlining the location of the utility box upon the wallboard distal side.

In still another form of the invention a method is provided for locating a utility box overlaid with wallboard. The method comprises the steps of providing a projection on the utility box, overlaying the utility box with wallboard thereby puncturing the wallboard with the projection, and placing a template over the wallboard with the projection extending through a template opening. The wallboard is then marked about the template which is then removed from the wallboard.

BRIEF DESCRIPTION OF THE DRAWING

FIG. 1 is an exploded view of a locator for a utility box embodying principles of the invention in one preferred form.

FIG. 2 is an end view in elevation of the locator support and projection components of the locator illustrated in FIG. 1.

FIG. 3 is a side elevational view of the locator components shown in FIG. 2.

FIG. 4 is a rear view, in elevation, of the locator components shown in FIG. 2.

FIG. 5 is a front elevational view of the template component of the locator shown in FIG. 1.

FIG. 6 is a front view, in elevation, of a utility box formed with projections which serve as a component of a utility box locator embodying principles of the invention in another preferred form.

FIG. 7 is a side elevational view of a portion of the utility box and the projections shown in FIG. 6.

FIG. 8 is a front elevational view of a template component of the locator used with the other locator component shown in FIGS. 6 and 7.

FIG. 9 is a front elevational view of a utility box and a locator component mounted therein embodying principles of the invention in yet another form.

FIG. 10 is a template component of a utility box locator component for use with the locator component shown in FIG. 9.

DESCRIPTION OF THE PREFERRED EMBODIMENTS

Figure 11:
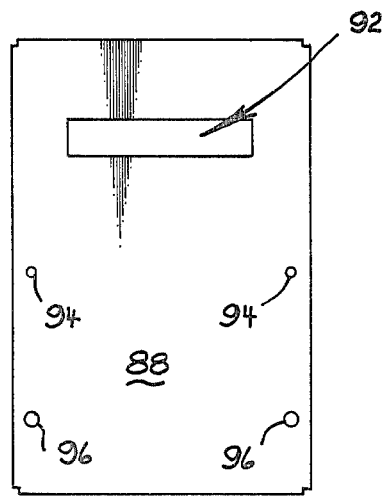
FIG. 11 is a front elevational view of a locator template component of the locator shown in FIG. 1.

Referring now in more detail to the drawing, there is shown in FIGS. 1-5 a locator for a utility box embodying principles of the present invention. Here a conventional utility box 10 is shown of rectilinear construction having upright sidewalls 12, top and bottom walls 14 and a rear wall 15. Aligned pair of holes 16 are formed in the sidewalls 12 to receive a pair of nails 18 therethrough in mounting the utility box to a stud 20. After the box has been nailed to the stud the stud and box are overlaid with a sheet of wallboard 22 such as sheetrock in conventionally constructional manner.

With continued reference to FIGS. 1-5 the locator for the utility box is seen to include a support 25 and a template 26. The support is of generally U-shaped configuration having two parallel and mutually spaced sides 28 that define a channel 30 therebetween which are unitarily joined together by an end wall 32. At least a portion 34 of one support side is corrugated for purposes hereinafter described. A pair of parallel generally cylindrical projections or pins extend normally from the end wall 32 with the upper projection 35 being of somewhat smaller diameter than the lower projection 36. The template 26 is seen to be of flat, sheet-like construction having a perimeter of size and shape approximating the rim 38 of the utility box. The template is provided with apertures 40 sized to receive projection 36 and apertures 42 sized to receive projection 35. An arrow 44 is printed upon the surface of the template as another aid to template orientation.

Once the utility box 10 has been secured by nails 18 to the stud 20 the U-shaped support 25 is slid over the utility box wall 12 located adjacent the stud whereby the support snuggly sandwiches the box wall. The height of the support 25 approximates that of the box sides whereby upon being mounted the location of the projections 35 and 36 is established with relationship to that of the utility box.

Once the support has been mounted with the support end wall 32 flush against the rim of the utility box it will be seen that further movement of the projections 35 and 36 is inhibited. Due to the presence of the corrugated portion 34 it will also be seen that the lower, larger projection 36 is located beneath the smaller projection 35 in correct support orientation. Were the reverse, inverted orientation attempted the corrugated portion 34 would be located outside the box side thereby inhibiting the support from being slid onto the utility box since the corrugations would tend to rub against the wooden stud. This would render the mounting difficult and thereby put the worker on notice that the support was being mounted incorrectly.

With the locator support now firmly mounted to the utility box, the sheet of wallboard 22 is pressed to the studs and in doing so is punctured by the projections 35 and 36. A worker on the side of the wallboard distal the utility box now sees the two projections projecting from the wallboard. The worker may now readily place the template 26 flush against the wallboard 26 with projection 36 passing through template aperture 40 and projection 35 passing through aperture 42. Again, correct orientation is insured by the fact that the upper aperture is sized only to receive the smaller projection 35 which can differ depending upon which side of the stud the box is mounted. Arrow 44 also indicates proper template orientation. The worker may now take a writing instrument and draw a line about the perimeter of the template, then remove the template, and finally cut an opening in the wallboard along the mark with a standard cutting tool and remove a rectilinear section of wallboard from the main body thereby revealing the presence of the utility box located therebehind. In marking the rectangular mark about the perimeter the writing instrument typically forms a mark at a slight distance away from the edge of the template itself whereupon the cutting instrument will itself, in following the mark, pass slightly about the utility box and locator. Slight enlargement of the template will also, of course, accomplish this. The locator support itself may now be removed from the utility box through the cut wallboard opening.

With reference next to FIGS. 6-8 a utility box locator is shown embodying principles of the invention in alternative form. Here, a utility box 50 is shown having a rear wall 52, a top 53, a bottom 54, a side wall 55 and an opposed side wall 56. The side wall 56 is seen to include an upper projection 58 and a lower projection 59 which extends outwardly from the edge 60 of side wall 56 that forms a portion of the box rim which defines an opening to receive utility components therein. The utility box itself is formed from a flat sheet of metal and thus the projections themselves are likewise so formed from the same sheet whereby they are of unitary construction with that of the box.

Here, upper projection 58 is seen to be somewhat shorter than the lower projection for identification and subsequent registration with template apertures. Each projection is also seen to include a score 61 adjacent its area of merger with the side wall itself. A template 64 is illustrated in FIG. 8 for use with these projections 58 and 59 by having an upper aperture 65 and a lower aperture 66 of respective shapes and sizes to snuggly accomodate the projections. Again, the template bears an arrow 68 for template orientation in addition to that provided by the differing sizes of the projections and apertures themselves.

The just described embodiment of FIGS. 6-8 is utilized in the following manner. Firstly, the utility box is mounted in a conventional manner to a wooden stud as with the use of nails. With the utility box firmly secured to the stud a sheet of wallboard is mounted to the stud overlaying the utility box. With the projections 58 and 59 projecting from the plane of the surface of the studs to which the wallboard is secured this action of mounting the wallboard itself causes the projections 58 and 59 to puncture the wallboard and penetrate somewhat to the side of the wallboard distal the stud. The template 64 may now be placed flush against the wallboard with the projection 58 passing through template aperture 65 and with projection 59 passing through aperture 66. As the perimeter of the template is again of a size and shape approximating that of the rim of the utility box, a marking as with a pencil about the perimeter of the template forms an outline on the side of the wallboard distal the utility box locating the hidden box. The projections 58 and 59 are then snapped sideways causing them to be severed along scores 61 from the utility box side wall 53. The template is then removed from the wallboard which is then cut along the rectangular line previously drawn around the template.

With reference next to FIGS. 9 and 10 a utility box locator in another form is seen to include a wedge shaped support 77 of a depth approximating that of a utility box 70 itself having sides 71 and 72, a top 73, bottom 74 and rear wall 75. The support 77, which has a pair of parallel projections 80 and 81, is sized also to be snugly placed in the box along a diagonal extending between box corners 78 and 79. So mounted, the rear edge of the support is in flush abutment with end wall 75. Once snuggly in place it will be appreciated that the projections 80 and 81 serve to locate the perimeter of the rim of the utility box itself about the opening facing the wallboard.

In use, wallboard is mounted over the utility box and in doing so causing projections 80 and 81 to puncture it. A template 83 having a perimeter of size and shape again approximating that of the rim of the utility box is then mounted over the wallboard with projection 80 passing through aperture 85. This embodiment is for use primarily with utility boxes in which utilities such as sockets are mounted only after the box has been mounted and overlaid with wallboard, or in those cases where the utilities houses within the box are themselves located to either side of the locator support. Once an opening has been cut in the wallboard along the line drawn about the edges of the template the support 77 is removed out of the opening cut within the wallboard from the utility box.

Figure 12:
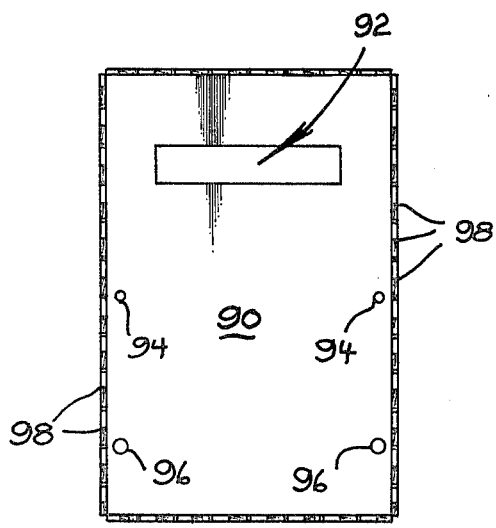
FIG. 12 is a rear elevational view of the template shown in FIG. 11.
Figure 13:
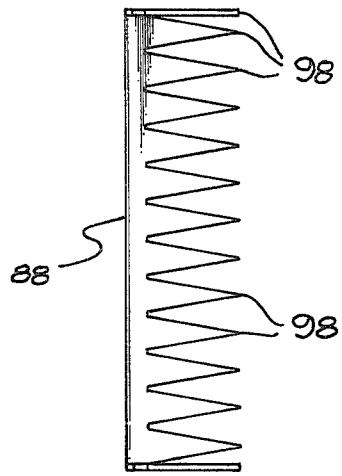
FIG. 13 is a side elevational view of the template shown in FIG. 11.

Finally, in FIGS. 11–13 a located template in an alternative form is shown. Here the template has opposed planar rectangular front and rear surfaces 88 and 90, respectively, which define an open slot 92, and apertures 94 and 96. The template also has a rectangular lip of serrated construction projecting normally from the rim of the rear surface 90 forming a set of cutting teeth 98. Preferably the serrated lip is formed unitarily with the flat portion of the template as, for example, stamped from a flat sheet of metal with the lip then bent. So constructed, the template surface 88 may be placed flush upon the sheet of wallboard with projections 35 and 36 extending through apertures 94 and 96 and the template outline drawn. The template is then inverted and surface 88 struck as with a hammer causing the teeth 98 to cut a rectangular section of wallboard. The inversion step here enables shorter projections to be employed than would otherwise be necessary. The template and cut section may then be jointly removed by inserting fingers into template opening 92 followed by removal of the locator support 25.

It should be understood that the just described embodiments merely illustrate principles of the invention in selected, preferred forms. Many modifications, additions, and deletions may, of course, be made thereto without departure from the spirit and the scope of the invention as set forth in the following claims.

I claim:

1. A locator for a utility box mountable to a stud with a box rim of preselected perimeter size and shape about a box opening facing a sheet of wallboard, and with the locator comprising, in combination, a generally rectangular support adapted to be snuggly mounted to the utility box, said support having an edge facing outwardly from the box when mounted on the box, from which support edge first and second projections of mutually different cross-sectional sizes project at a preselected projection spacing, and a template of perimeter size and shape approximating that of the box rim and formed with first and second apertures of sizes closely approximating said cross-sectional sizes of said first and second projections, respectively, and spaced apart a distance closely approximating said preselected projection spacing, whereby said template may only be placed on the support projections in one preselected orientation with the first projection extending through the first aperture and the second projection extending through the second aperture.

2. A utility box locator in accordance with claim 1 wherein said first and second locator pins are located adjacent a first side edge of said template, and wherein said template is formed with third and fourth apertures located adjacent a side edge of said template opposite said first side edge and sized to receive said one and second locator pins, respectively.

3. A locator for a utility box mountable to a stud with a box rim of preselected perimeter size and shape about a box opening facing a sheet of wallboard, and a side wall of preselected dimensions, and with the locator comprising, in combination, a support adapted to be snuggly mounted to the utility box from which support at least one locator projection projects, said support being of generally U-shaped configuration defining a channel sized to snuggly receive a wall of the utility box and having dimensions approximating said preselected dimensions whereby the locator support may sandwich the entire utility box side wall fixedly located with respect thereto between other rim members, and a template of perimeter size and shape approximating that of the box rim and formed with at least one aperture sized to receive said locator projection.

4. A locator for a utility box of rectilinear configuration mountable to a stud with a box rim of preselected perimeter size and shape about a box opening facing a sheet of wallboard, comprising, in combination, a support sized to be wedged within the utility box along a box diagonal from which support at least one pin projects, and a template of perimeter size and shape approximating that of the box rim and formed with at least one aperture sized to receive said locator pin.

5. A locator for a utility box mountable to a stud with a box rim of preselected perimeter size and shape about a box opening facing a sheet of wallboard, and with the locator comprising, in combination, first and second locator projections formed unitarily with and projecting from said box rim and being of mutually different cross-sectional projection sizes, and a template of perimeter size and shape approximating that of the box rim and formed with first and second apertures of sizes closely approximating said cross-sectional sizes of said first and second projections, whereby said template may only be placed upon said projections in one orientation with the first projection extending through the first aperture and the second projection extending through the second aperture.

* * * * *